(12) United States Patent
Yin et al.

(10) Patent No.: US 8,054,616 B2
(45) Date of Patent: Nov. 8, 2011

(54) KEYBOARD SET HAVING A MICRO PROJECTOR

(75) Inventors: Nan-Jiun Yin, Hsinchu (TW); Ming-Lung Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 123 days.

(21) Appl. No.: 12/585,906

(22) Filed: Sep. 29, 2009

(65) Prior Publication Data

US 2010/0085705 A1  Apr. 8, 2010

(30) Foreign Application Priority Data

Oct. 3, 2008  (TW) ................................ 97138037 A (51) Int. Cl.
  *G06F 1/16* (2006.01)
(52) U.S. Cl. ........... 361/679.1; 361/679.09; 361/679.18; 361/679.4; 353/119; 353/122; 312/223.1; 312/223.2
(58) Field of Classification Search ................ 361/679.1, 361/679.18, 679.23
  See application file for complete search history.

(56) References Cited

U.S. PATENT DOCUMENTS

| | | | | |
|---|---|---|---|---|
| 5,510,806 | A * | 4/1996 | Busch | 345/87 |
| 5,658,063 | A * | 8/1997 | Nasserbakht | 353/122 |
| 6,163,326 | A * | 12/2000 | Klein et al. | 345/156 |
| 6,166,722 | A * | 12/2000 | Kawabe et al. | 345/169 |
| 6,215,420 | B1 * | 4/2001 | Harrison et al. | 341/22 |
| 6,690,352 | B2 * | 2/2004 | Cheng et al. | 345/156 |
| 6,764,184 | B1 * | 7/2004 | Carkner | 353/119 |
| 6,873,356 | B1 * | 3/2005 | Kanbe et al. | 348/207.1 |
| 6,972,945 | B1 * | 12/2005 | Kozak et al. | 361/679.08 |
| 7,641,348 | B2 * | 1/2010 | Yin et al. | 353/119 |
| RE41,977 | E * | 11/2010 | Matsumoto et al. | 709/250 |
| 7,848,089 | B2 * | 12/2010 | Liang et al. | 361/679.08 |
| 2003/0117343 | A1 * | 6/2003 | Kling | 345/32 |
| 2005/0112537 | A1 * | 5/2005 | Wu | 434/310 |
| 2007/0236672 | A1 * | 10/2007 | Wee et al. | 353/122 |
| 2008/0136973 | A1 * | 6/2008 | Park | 348/744 |

FOREIGN PATENT DOCUMENTS

| | | |
|---|---|---|
| TW | M268621 | 6/2005 |
| TW | M269510 | 7/2005 |

* cited by examiner

*Primary Examiner* — Jinhee Lee
*Assistant Examiner* — Anthony Q Edwards
(74) *Attorney, Agent, or Firm* — Bacon & Thomas, PLLC (57) ABSTRACT

A keyboard set includes a keyboard unit, and a micro projector. The keyboard unit has a first housing, a video signal port and a first lock structure. The video signal port and the first lock structure are disposed in the first housing. The micro projector has a second housing, a signal line, and a second lock structure. The signal line is connected to the video signal port of the keyboard unit. The second lock structure is disposed on the second housing, and capable of combining with the first lock structure, for the micro projector to be fixed to the keyboard unit.

11 Claims, 8 Drawing Sheets

KEYBOARD SET HAVING A MICRO PROJECTOR

BACKGROUND OF THE INVENTION (1) Field of the Invention

The invention relates to a keyboard set, and more particularly relates to a keyboard set with projecting function.

(2) Description of the Related Art

With progress of the times, computer device focuses on multimedia function, and the interface device of the computer device tends to be diversified.

Figure 1:
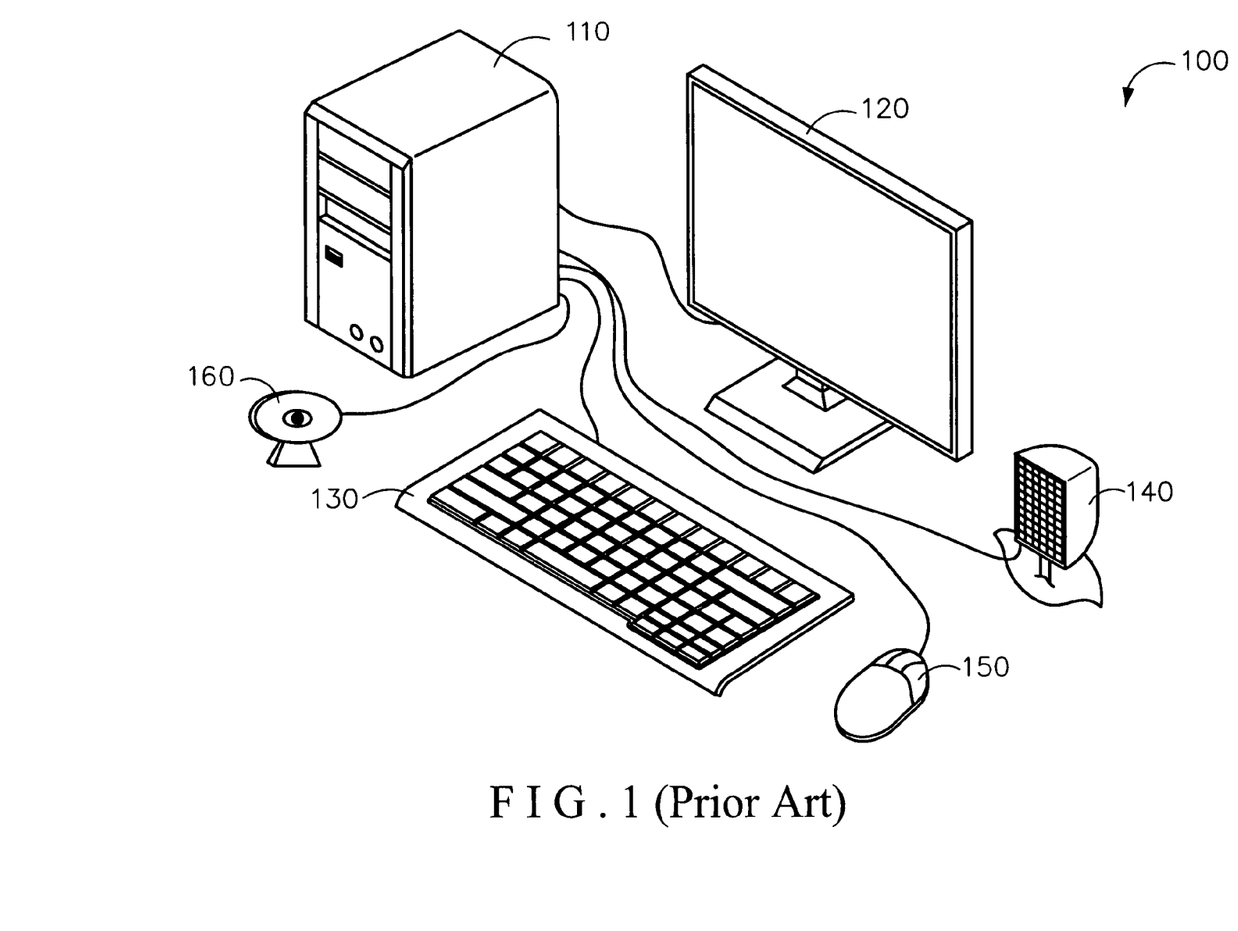
FIG. 1 is a schematic view of a conventional desktop computer device 100.

Refer to FIG. 1 for a schematic view of a conventional desktop computer device 100. The desktop computer device 100 usually has a host 110, a screen 120, a keyboard 130, a horn 140, a mouse 150, and a video camera 160. As FIG. 1 shows, each of the peripheral devices connects and communicates with the host 110 via a signal line (not shown).

However, all peripheral devices applied in the conventional computer device 100 are connected to the host 110 by signal lines. More peripheral devices need more signal lines. When these lines are scattered on the desk, it is unsightly and also inconvenient to arrange these lines. If users want to move the host 110 to another place, they may move all the peripheral devices together.

Moreover, the keyboard 130 and the screen 120 usually occupy much space on the desk. Although the liquid crystal display (LCD) is very popular nowadays, the LCD is still bulky and has to be connected to the host 110, and thus bringing inconvenience for moving.

For high speed wireless or wire transmission and micro projection system grows mature, the micro projection system saves space occupied by the screen 120 and the signal lines if the micro projection system replaces the screen 120.

SUMMARY OF THE INVENTION

The invention is to provide a keyboard set integrating the functions of the conventional keyboard and screen to save space.

According to an embodiment of the invention, a keyboard set is provided. The keyboard set includes a keyboard unit and a micro projector. The keyboard unit has a first housing, a video signal port and a first lock structure. The video signal port and the first lock structure both are disposed on the first housing. The micro projector has a second housing, a signal line connected to the video signal port, and a second lock structure disposed on the second housing and combined with the first lock structure selectively In an embodiment, the first housing provides a dent with the video signal port on a sidewall of the dent, and the first lock structure is disposed in an area of the first housing near the dent. The second lock structure is locked with the first lock structure for fixing the micro projector on the keyboard unit when the second housing is placed in the dent.

In an embodiment, the first lock structure has two blocks located at the two opposite sides of the dent of the first housing and protruded from the wall of the dent respectively. The second lock structure has two slots disposed on two opposite sides of the micro projector respectively. Moreover, the two slots and the second housing are integrally formed. Each of the blocks is connected to a sliding key. Two strip ports are disposed in the area of the first housing near the dent and at two opposite sides of the dent respectively. The sliding keys are disposed in the long strip ports and capable of sliding between two ends of the strip ports back and forth. The blocks are moved and locked into the slots when the micro projector is placed in the dent.

In an embodiment, the first lock structure has two slots located at the two opposite sides of the first housing. The second lock structure has two hooks disposed on two opposite sides of the second housing respectively. The two hooks and the second housing are integrally formed.

In an embodiment, the keyboard unit has a hub connected to the video signal port and a plurality of peripheral units including a mouse, a horn, a earphone, a microphone, a card reader, and a web camera. Moreover, the keyboard unit is connected to a computer processing unit through a wired or wireless transmission unit.

The embodiment or embodiments of the invention may have at least one of the following advantages: A. reducing the signal lines of desktop computer devices; B. integrating the peripheral units into the keyboard set for using more conveniently; C. users may select position of the computer freely in the scope that the wireless or wired transmission unit may receive signals by carrying the keyboard set.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE PRESENT EMBODIMENTS

In the following detailed description of the present embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items.

Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 2A:
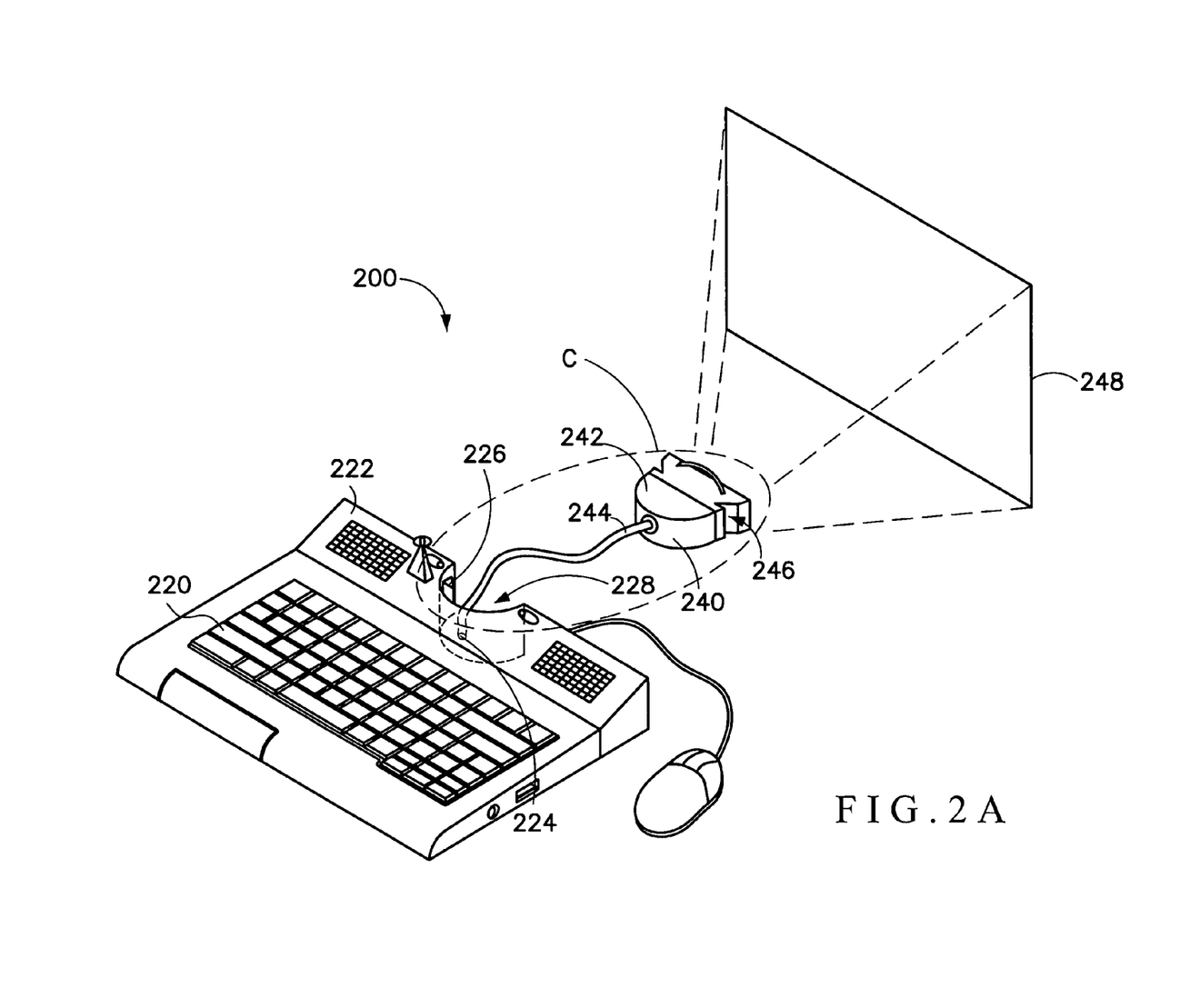
FIG. 2A is a schematic view of an embodiment of the keyboard set according to the invention.

Referring to FIG. 2A, the keyboard set 200 in the first embodiment includes a keyboard unit 220 and a micro projector 240. The keyboard unit 220 has a first housing 222, a video signal port 224 and a first lock structure 226. The first housing 222 provides a dent 228. The video signal port 224 is disposed on the wall of the dent 228. The micro projector 240 has a second housing 242, a signal line 244, and a second lock structure 246. In the embodiment, the signal line 244 between the second housing 242 and the keyboard unit 220 is connected to a winding mechanism (not shown) for retracting and holding. Thus, the micro projector 240 may be disassembled from the keyboard unit 220 and moved to a suitable position for projection by users. The keyboard unit 220 sends the image signals to the micro projector 240 via the signal line 244 to form an image 248 when the keyboard unit 220 receives image signals from the host.

The second housing 242 is capable of being assembled in the dent 228 of the first housing 222. In other words, the shape of the second housing 242 is corresponding to the shape of the dent 228. The signal line 244 is connected to the video signal port 224 of the keyboard unit 220. When the second housing 242 of the micro projector 240 is assembled into the dent 228, the second lock structure 246 locks the first lock structure 226 to fix the micro projector 240 on the keyboard unit 220.

Figure 2B:
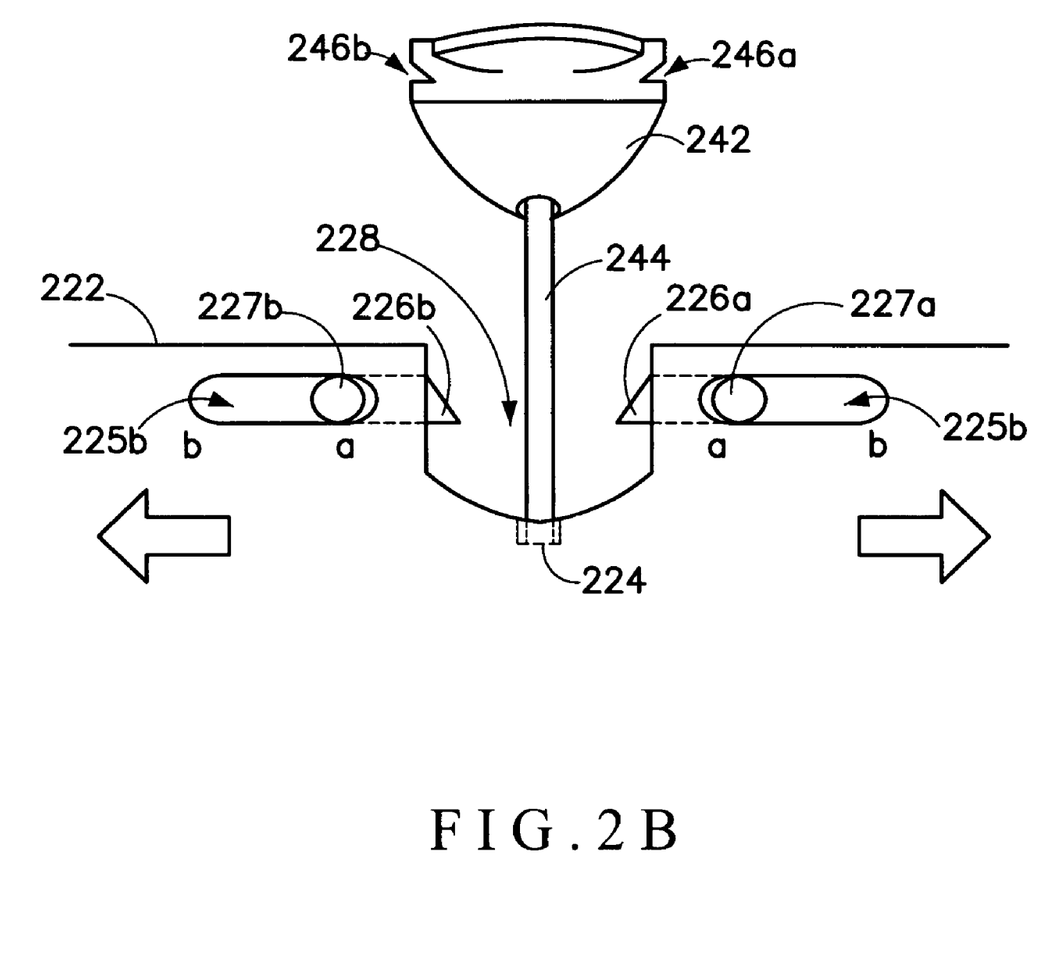
FIG. 2B is a schematic view of the part C in FIG. 2A.

Referring to FIG. 2B, in this embodiment, the first lock structure 226 has two blocks 226a and 226b disposed in an area of the first housing 222 near the dent 228 and on two opposite sides of the dent 228, such as left side and right side respectively. The two blocks 226a and 226b may be protruded from the wall of the dent 228. The second lock structure 246 has two slots 246a and 246b deposed on two opposite sides of the second housing 242 of the micro projector 240. The two slots 246a and 246b and the second housing 242 may be integrally formed.

As FIG. 2B shows, the blocks 226a and 226b are connected to sliding keys 227a and 227b separately. The sliding keys 227a and 227b are used as manual switches. The sliding keys 227a and 227b are disposed inside strip ports 225a and 225b respectively, and may slide back and forth between two ends of the strip port 225a and 225b (position a and b) and drive the blocks 226a and 226b at the same time. The two strip ports 225a and 225b are disposed in an area of the first housing 222 near the dent 228 and disposed on two opposite sides of the dent 228, such as left side and right side of the first housing 222 in the dent 228. When the second housing 242 of the micro projector 240 is disposed in the dent 228 of the keyboard unit 220, the blocks 226a and 226b are locked in the slots 246a and 246b respectively.

Thus, the micro projector 240 fixed on the keyboard unit 220 may be disassembled and removed as required. When disassembling, after the sliding keys 227a and 227b on both sides of the micro projector 240 are moved from position a to position b (as arrows point), the blocks 226a and 226b are drawn back into the first housing 222. At this time, users may pull the micro projector 240 out from the dent 228 and put the micro projector 240 at any place. In the embodiment, the blocks 226a and 226b appear wedge as shown. The sliding keys 227a and 227b return to position a automatically to make the blocks 226a and 226b re-enter the dent 228 when the users loose the sliding keys 227a and 227b. To store the micro projector 240 into the dent 228, users may need to push the micro projector 240 into the dent 228 to move the sliding keys 227a and 227b to position b, and then the keys are pulled back to position a by spring bounce (not shown) of the first lock structure 226. Hence, the blocks 226a and 226b fix the micro projector 240 on the keyboard unit 220 automatically.

Figure 3A:
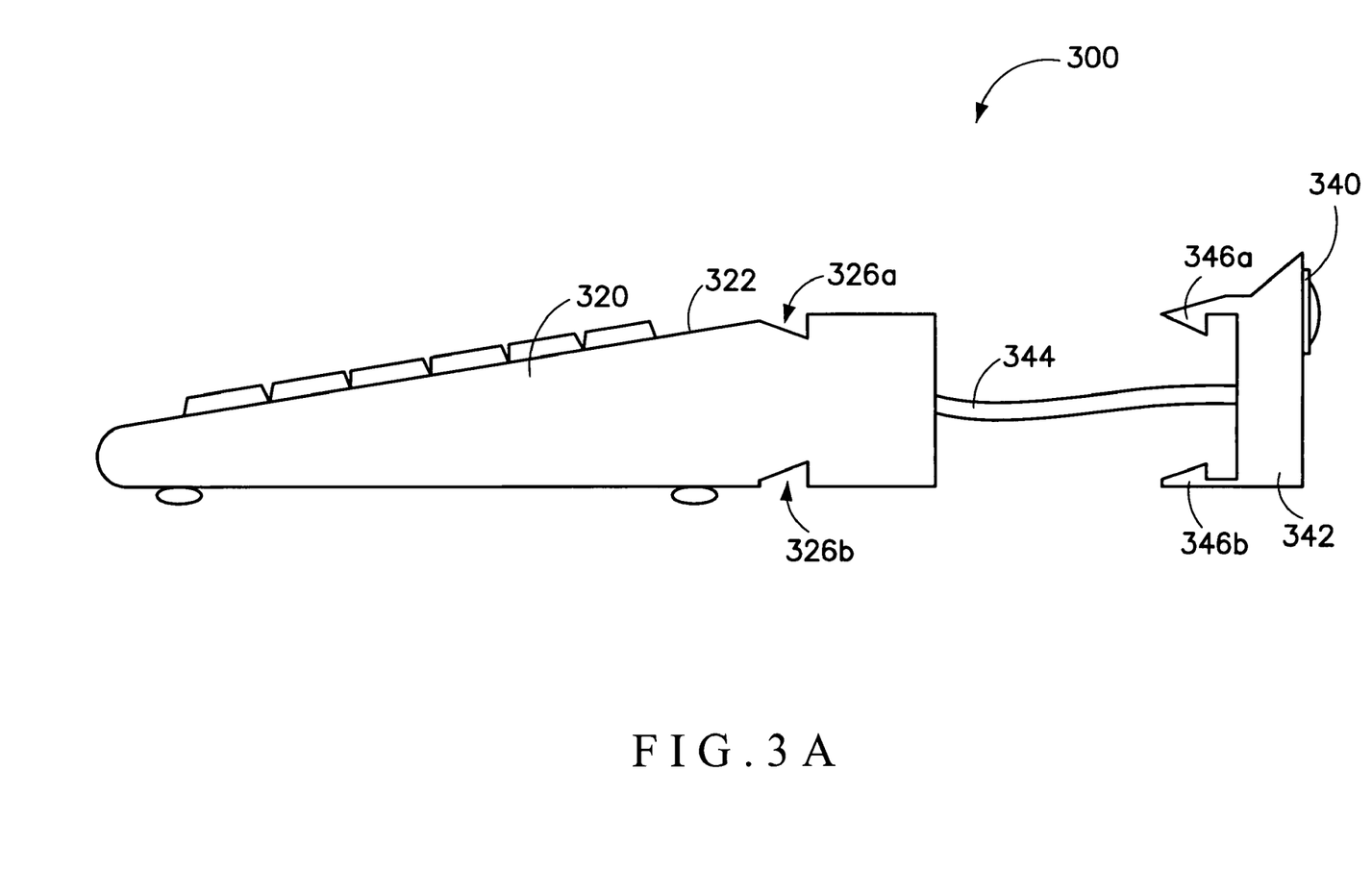
FIGS. 3A and 3B are schematic views of an embodiment of the keyboard set according to the invention.

Referring to FIG. 3A, in the second embodiment, a keyboard set 300 also has a keyboard unit 320 and a micro projector 340. The keyboard unit 320 and the micro projector 340 are connected by a first lock structure and a second lock structure. Different from the first embodiment, the first lock structure of the keyboard unit 320 has two slots 326a and 326b disposed on two opposite sides of the first housing 322 such as upside and underside. The second lock structure has two elastic hooks 346a and 346b respectively disposed on upside and underside of the second housing 342 of the micro projector 340. The two slots 326a, 326b and the first housing 322 may be integrally formed. The two hooks 346a, 346b and the second housing 342 may also be integrally formed.

Figure 3B:
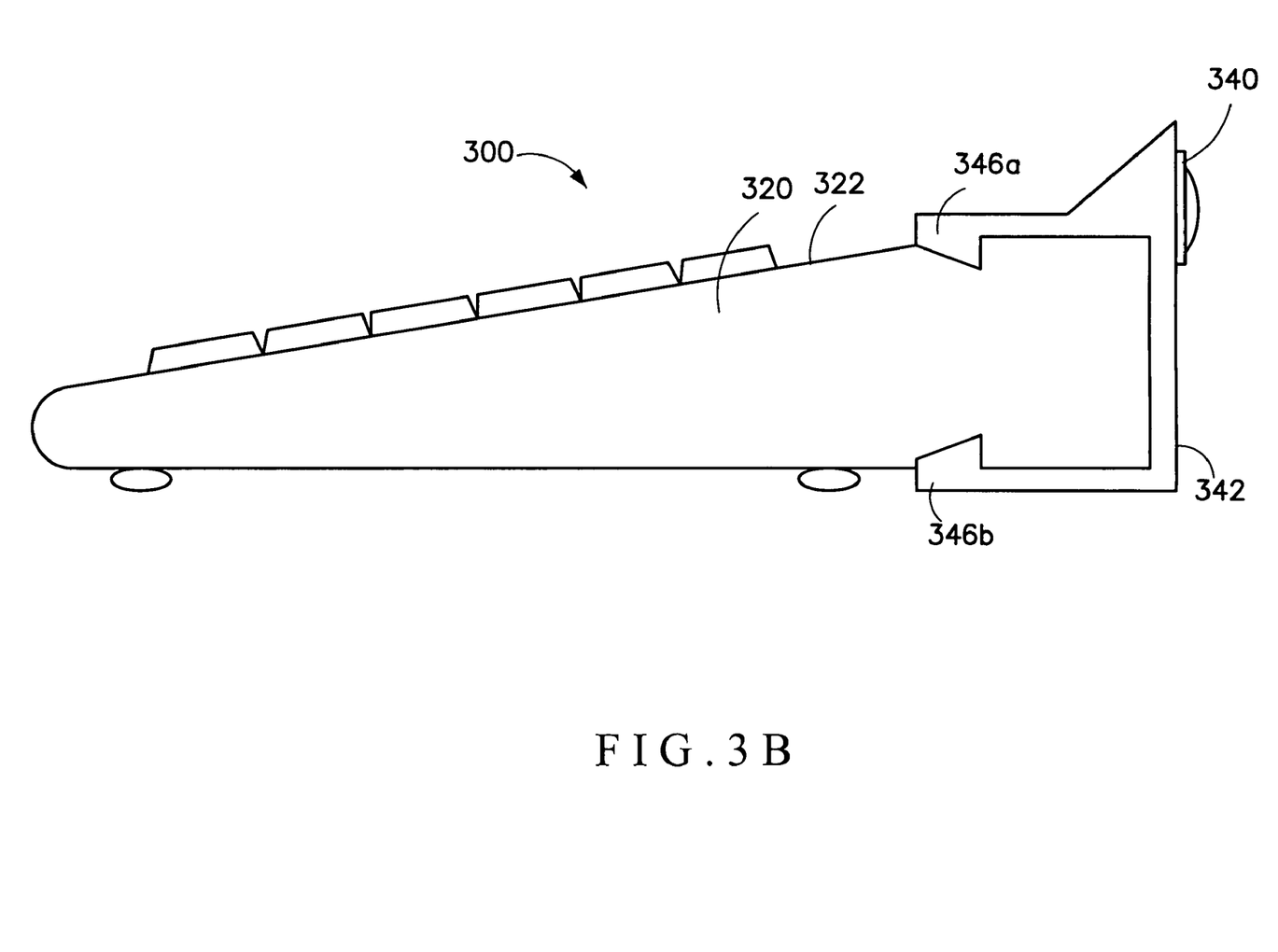

Referring to FIGS. 3A and 3B, with the elasticity of the hooks 346a and 346b, when storing the micro projector 340, users may need to lock the second housing 342 of the micro projector 340 to the first housing 322. As FIG. 3A shows, the hooks 346a and 346b slide into the slots 326a and 326b, and fix the micro projector 340 to the keyboard unit 320. When disassembling the micro projector 340, users may need to loose the hooks 346a and 346b, and pull the micro projector 340 out. The signal line 344 between the second housing 342 of the micro projector 340 and the keyboard unit 320 is also connected to a extendible winding mechanism (not shown) for moving the micro projector 340 to a suitable position.

Figure 4:
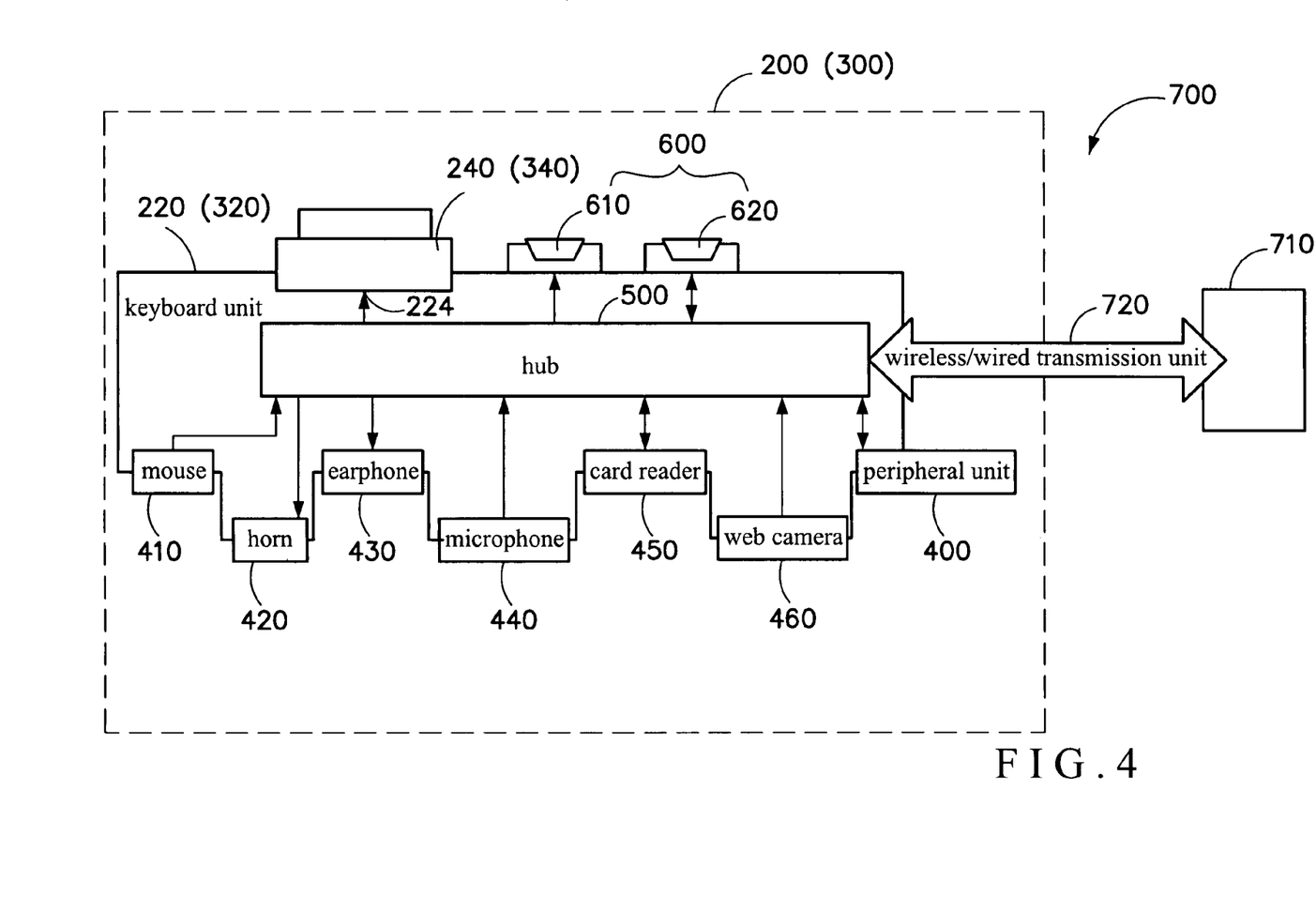
FIG. 4 is a block diagram of an embodiment of the computer system according to the invention.

Referring to FIG. 4, besides the micro projector 240 or 340, the keyboard unit 220 or 320 may also connect to a plurality of peripheral units such as a mouse 410, a horn 420, a earphone 430, a microphone 440, a card reader 450, and a web camera 460 or other peripheral units 400 furthermore. The keyboard unit 220, 330 has a hub 500 for connecting the video signal port 224 and all kinds of abovementioned peripheral units. Moreover, the hub 500 may also connect to a plurality of connecting ports (I/O ports) 600 such as a VGA port and a USB port 620 for connecting required peripheral devices, such as flash drive or other devices transmitting USB signals or VGA signals.

Referring to FIG. 4 the computer system 700 has a computer processing unit 710, a transmission unit 720, and a keyboard set 200 (300). As abovementioned, the keyboard set 200(300) includes the micro projector 240(340), a plurality of peripheral units, a plurality of connecting ports 600, and the keyboard unit 220(320) for integrating these peripheral units and connecting units. The computer processing unit 710 may be a common desktop computer host. The transmission unit 720 may be a wireless (infrared or blue tooth transmission) or wired high speed transmission interface for transmitting signals between the computer processing unit 710 and the keyboard set 200 (300). The micro projector 240(340) is a small light emitting diode (LED) projector or other mini-projector disposed on the keyboard unit 220(230) for projection, the micro projector 240(340) is capable of being disassembled for moving. The keyboard unit 220(320) is a main interface tool for users integrating the mouse 410, the horn 420, the earphone 430, the microphone 440, the card reader 450, the web camera 460, the VGA port 610, and the USB port 620 to form the keyboard set 200(300). The keyboard set 200(300) may be regarded as a multifunction keyboard.

The computer system 700 is processed as follows. The computer processing unit 710 combines all signals being sent to the peripheral units, and then sends the signals to the keyboard set 200(300) via the wireless or wired transmission unit 720. The keyboard set 200(300) distributes signals to the peripheral units by the inbuilt hub 500 and also integrates the micro projector 240(340) in above embodiments fixed on the keyboard unit 220(230) for projecting image. If necessary, the micro projector 240(340) may be disassembled and moved to a better position. The video signal is also sent to the micro projector 240(340) via the hub 500 in the keyboard set 200 (300).

Thus, users may operate the computer processing unit 710 in the scope that the wireless or wired transmission unit 720 may receive signals by carrying the keyboard set 200(300) without moving so many external peripheral devices. The keyboard set 200 or 300 without using the micro projector 240(340) may use the VGA port 610 of the keyboard set 200 or 300 to connect any display device.

Figure 5:
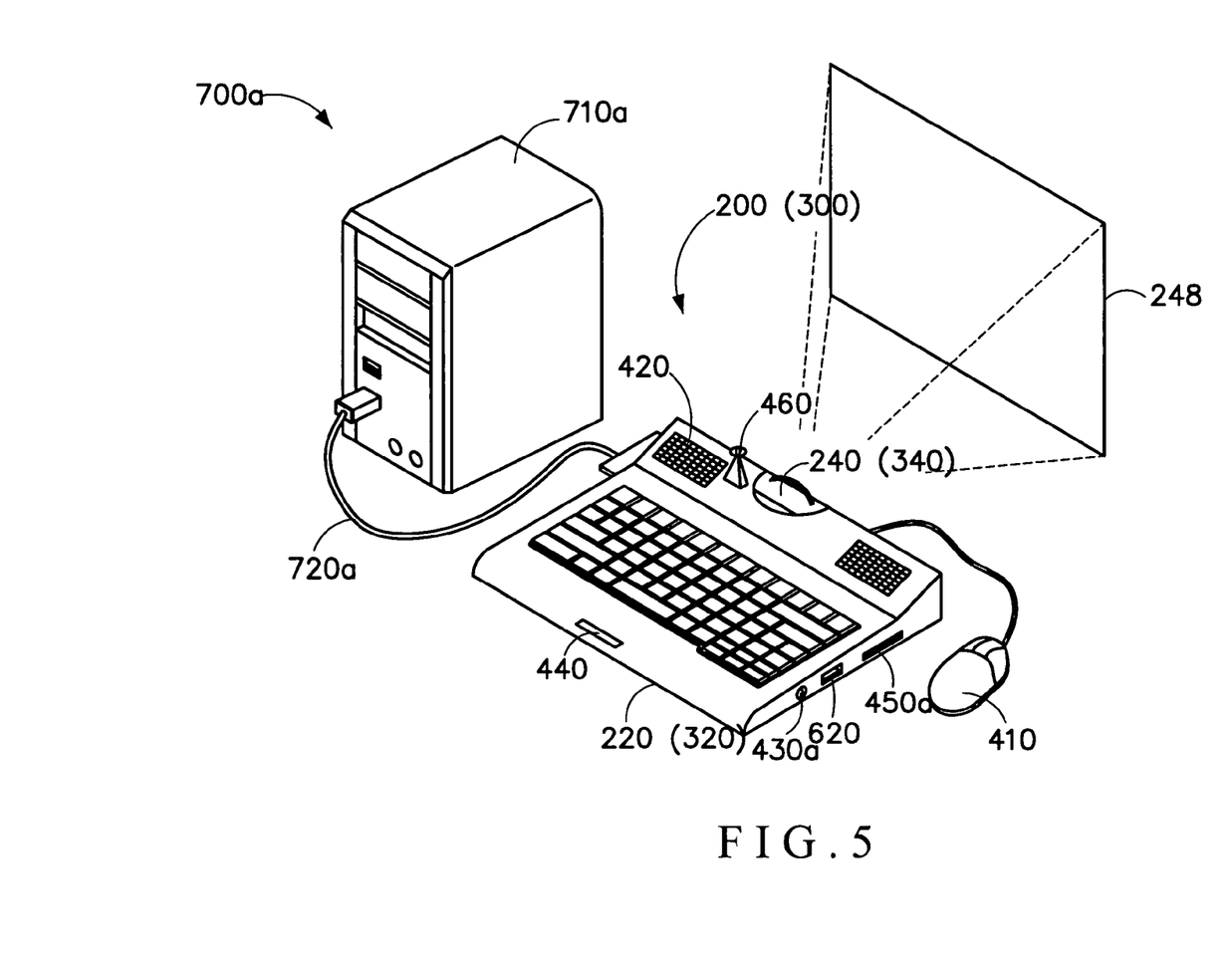
FIG. 5 is a schematic view of an embodiment of the computer device according to the invention.
Figure 6:
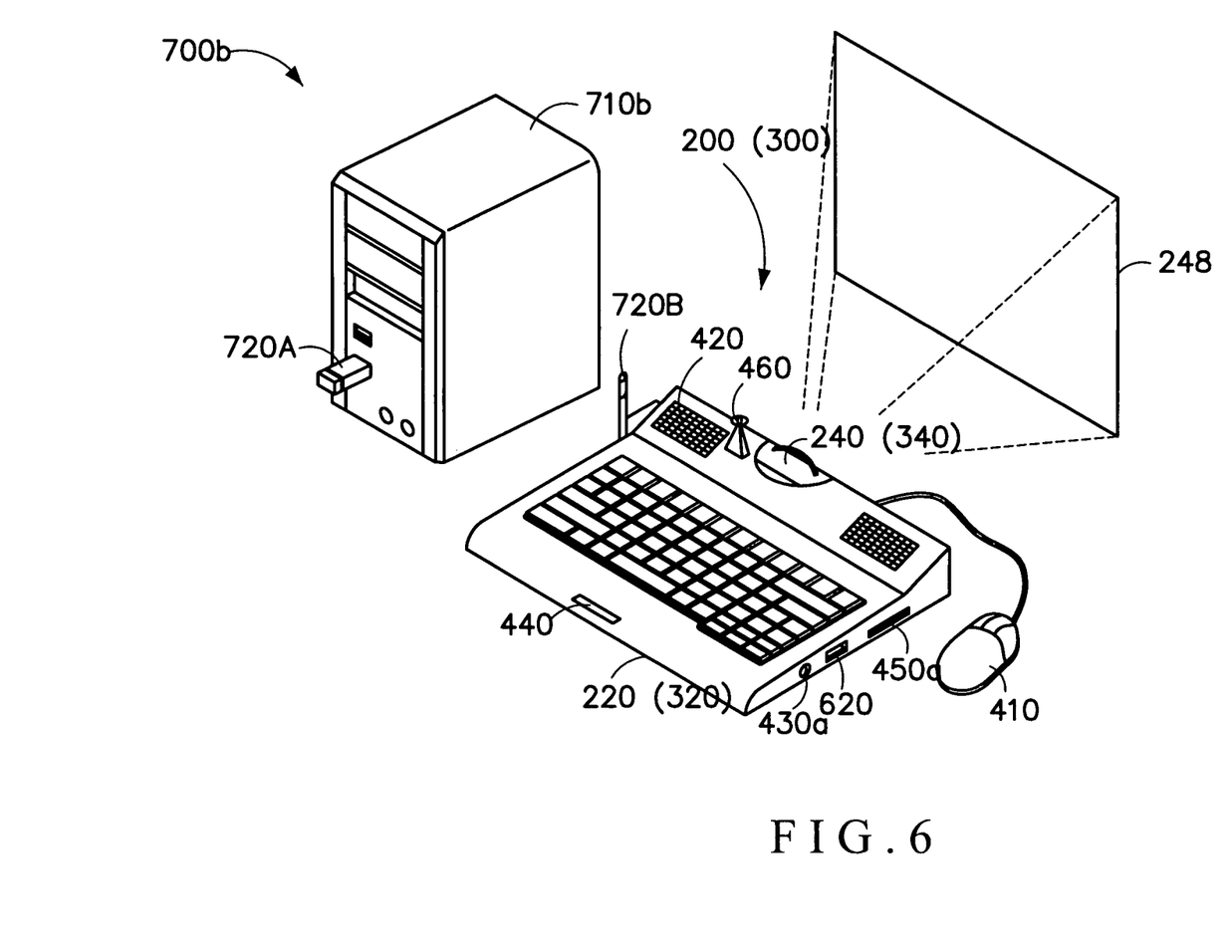
FIG. 6 is a schematic view of another embodiment of the computer devices according to the invention.

Referring to FIG. 5 and FIG. 6, a host 710a of a desktop computer device 700a is connected to the keyboard unit 220 (320) via a wired transmission unit 720a, such as a signal line with USB port or IEEE 1394 port. The micro projector 240 (340) is disposed in the dent 228 at front part of the keyboard unit 220(320). In the embodiment, the mouse 410 is connected to USB port (not shown) of the keyboard unit 220 (230). The horn 420, the microphone 440 and the web camera 460 are disposed on the upside of the keyboard unit 220(230). The USB port 620, the earphone jack 430a, and the card reader jack 450a are assembled on the side of the keyboard unit 220(230).

As FIG. 6 shows, a wireless emitter 720A is connected to the host 710b of the desktop computer device 700b via a USB port to transfer signals with a wireless receiver 720B of the keyboard set 200(300).

The wireless transmission unit made up of the wireless emitter 720A and the wireless receiver 720B may be realized by ultra mobile broadband (UMB), wireless fidelity (Wi-Fi) or other technologies.

In summary, the keyboard set 200(300) in the embodiments of the invention integrates a micro projector 240(340) to replace traditional screen for projecting image. Thus, users carrying the keyboard set 200(300) may select position of the computer freely. They may need to move the keyboard set 200(300) to any place with the host 710a(710b), equivalently to moving the whole desktop computer device 700a(700b), so that the convenience of movement is enhanced.

The micro projector 240(340) disposed on the keyboard unit 220(320) may be disassembled and moved to the most suitable position when necessary. In addition, the keyboard set 200(300) also integrates the mouse 410, the horn 420, the earphone 430, the microphone 440, the card reader 450, the web camera 460, the hub 500, the VGA port 610, and the USB port 620, and thus reducing number of the signal lines.

Therefore, the keyboard set 200, 300 utilizing the above embodiments may reduce the signal lines of desktop computer devices and make the desktop computer devices more convenient to move and use.

The foregoing description of the present embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suitable for the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A keyboard set, comprising:
   a keyboard unit, having a first housing, a video signal port, and a first lock structure, wherein the video signal port and the first lock structure are disposed on the first housing; and
   a micro projector, having a second housing, a signal line connected to the video signal port, and a second lock structure disposed on the second housing and combined with the first lock structure selectively for fixing the micro projector on the keyboard unit, wherein the first lock structure of the keyboard unit has two slots and the second lock structure has two hooks disposed on two opposite sides of the second housing of the micro projector respectively, the two hooks are capable of locking into the two slots of the first lock structure.

2. The keyboard set of claim 1, wherein the two hooks and the second housing are integrally formed.

3. The keyboard set of claim 1, wherein the keyboard unit has a hub connected to the video signal port and a plurality of peripheral units comprising a mouse, a horn, a earphone, a microphone, a card reader, and a web camera.

4. The keyboard set of claim 3, wherein the hub is connected to a plurality of connecting ports.

5. The keyboard set of claim 3, wherein the keyboard unit is connected to a computer processing unit through a wired transmission unit.

6. The keyboard set of claim 3, wherein the keyboard unit is connected to a computer processing unit through a wireless transmission unit.

7. A keyboard set, comprising:
a keyboard unit, having a first housing, a video signal port, and a first lock structure, wherein the video signal port and the first lock structure are disposed on the first housing, wherein the first lock structure has two blocks and two sliding keys connected to the blocks respectively; and
a micro projector, having a second housing, a signal line connected to the video signal port, and a second lock structure disposed on the second housing and combined with the first lock structure selectively for fixing the micro projector on the keyboard unit, wherein the second lock structure has two slots,
wherein the first housing provides a dent with the video signal port on a sidewall of the dent, and the first lock structure is disposed in an area of the first housing near the dent, and the second lock structure is locked with the first lock structure when the second housing is placed in the dent,
two strip ports are disposed in the area of the first housing near the dent and at two opposite sides of the dent respectively, the sliding keys are disposed in the long strip ports and capable of sliding between two ends of the strip ports back and forth, and the blocks are moved and locked into the slots when the micro projector is placed in the dent.

8. The keyboard set of claim 7, wherein the keyboard unit has a hub connected to the video signal port and a plurality of peripheral units comprising a mouse, a horn, a earphone, a microphone, a card reader, and a web camera.

9. The keyboard set of claim 8, wherein the hub is connected to a plurality of connecting ports.

10. The keyboard set of claim 8, wherein the keyboard unit is connected to a computer processing unit through a wired transmission unit.

11. The keyboard set of claim 8, wherein the keyboard unit is connected to a computer processing unit through a wireless transmission unit.

* * * * *